(12) United States Patent     (10) Patent No.:     US 12,673,376 B2
Tsukuda     (45) Date of Patent:          Jul. 7, 2026

(54) WIRE ELECTRIC DISCHARGE MACHINING APPARATUS

(71) Applicant: Sodick Co., Ltd., Kanagawa (JP)

(72) Inventor: Manabu Tsukuda, Kanagawa (JP)

(73) Assignee: Sodick Co., Ltd., Kanagawa (JP)

( * ) Notice:     Subject to any disclaimer, the term of this patent is extended or adjusted under 35 U.S.C. 154(b) by 937 days.

(21) Appl. No.: 17/965,784

(22) Filed:     Oct. 14, 2022

(65)     Prior Publication Data

US 2023/0135308 A1     May 4, 2023

(30)     Foreign Application Priority Data

Oct. 29, 2021     (CN) ......................... 202111276463.7

(51) Int. Cl.
  B23H 1/02          (2006.01)
  B23H 7/10          (2006.01)
(52) U.S. Cl.
  CPC ............. B23H 1/022 (2013.01); B23H 7/105 (2013.01)
(58) Field of Classification Search
  CPC . B23H 7/10; B23H 7/104; B23H 1/02; B23H 1/022; B23H 7/105
  USPC ........... 219/69.13, 69.12, 86.1, 78.16, 91.21, 219/85.15
  See application file for complete search history.

(56)     References Cited

U.S. PATENT DOCUMENTS 4,803,327 A   *   2/1989   Obara ...................... B23H 7/10
                                                              219/69.12
9,833,852 B2     12/2017   Yamada et al.

FOREIGN PATENT DOCUMENTS

CN          112262011        1/2021
EP            2158993        3/2010
JP           S6362618        3/1988
JP          H06320342       11/1994
JP         2010052092        3/2010

OTHER PUBLICATIONS

"Search Report of Europe Counterpart Application", issued on Apr. 17, 2023, p. 1-p. 9.

* cited by examiner

*Primary Examiner* — Phuong T Nguyen
(74) *Attorney, Agent, or Firm* — JCIPRNET

(57)          ABSTRACT

An upper guide assembly includes an upper wire guide, an upper power feed contact, and a power feed contact movement device, and a lower guide assembly includes a lower power feed contact. The upper power feed contact and the lower power feed contact are configured to contact the wire electrode to supply power by moving in a horizontal direction from initial positions not contacting the wire electrode. The power feed contact movement device is configured to move the upper power feed contact in the horizontal direction from the initial position by a predetermined offset amount. The offset amount is set based on a machining condition including at least one of a condition of the wire electrode, a condition of a workpiece, and a surface roughness required for a cut surface of the workpiece.

15 Claims, 7 Drawing Sheets

Example 1          Example 2          Example 3          Comparative Example 1
d1 = 0.5 mm        d1 = 0.2 mm        d1 = 0 mm          d1 = 0.8 mm

WIRE ELECTRIC DISCHARGE MACHINING APPARATUS

CROSS-REFERENCE TO RELATED APPLICATION

This application claims the priority benefit of Chinese Application Serial No. 202111276463.7, filed on Oct. 29, 2021. The entirety of the above-mentioned patent application is hereby incorporated by reference herein and made a part of this specification.

BACKGROUND

The invention relates to a wire electric discharge machining apparatus which generates a discharge in a work gap formed between a moving wire electrode and a workpiece to machine the workpiece. More specifically, the invention relates to a wire electric discharge machining apparatus in which a power pulse is supplied to the work gap via an upper power feed contact and a lower power feed contact provided above and below the workpiece.

In general, a wire electrode is guided by an upper wire guide and a lower wire guide provided above and below a workpiece to be conveyed downward facing the workpiece. The upper wire guide and the lower wire guide are respectively incorporated to an upper side guide assembly and a lower guide assembly. The upper power feed contact and the lower power feed contact provided above and below the workpiece are also respectively incorporated into the upper guide assembly and the lower guide assembly. The upper power feed contact and the lower power feed contact are connected to a power source and pressed against the moving wire electrode. During machining, electric power is supplied to the wire electrode via the upper power feed contact and the lower power feed contact.

In accordance with the condition of the workpiece and the machining accuracy and efficiency as required, the material or the diameter of the wire electrode is selected, and the movement speed of the wire electrode or the tension applied to the wire electrode during machining is set. U.S. Pat. No. 9,833,852 discloses a wire electric discharge machining apparatus preventing a breakage of a wire electrode and facilitating machining efficiency.

When the power feed contact contacts the moving wire electrode, cracks are generated on the surface of the wire electrode due to friction. In addition, due to friction, the wire electrode may be scraped off and debris may be generated. When excessive cracks and debris are generated on the surface of the wire electrode due to friction with the upper power feed contact, the cut surface of the workpiece may become uneven or have strips, and the machining accuracy is low.

Meanwhile, when the contact pressure between the wire electrode and the upper power feed contact is reduced in order to suppress friction, the power supplied to the wire electrode is reduced, and the machining speed is low. Even if the contact pressure remains the same, due to a condition such as the material of the wire electrode, cracks or debris may be generated. Even if the cut surface becomes uneven or has strips, depending on the surface roughness required for the cut surface, this may not be an issue in some cases. Therefore, it is favorable that the contact pressure be properly adjusted in accordance with the machining condition.

The invention has been made in view of the above issue, and an objective of the invention is to provide a wire electric discharge machining apparatus and a wire electric discharge machining method capable of facilitating machining accuracy while suppressing the decrease in machining speed to minimum.

SUMMARY

An aspect of the invention provides a wire electric discharge machining apparatus including a wire electrode, an upper guide assembly, and a lower guide assembly. The upper guide assembly and the lower guide assembly are respectively provided on an upper side and a lower side of the workpiece in an upper-lower direction with respect to the workpiece, and the upper guide assembly includes an upper wire guide, an upper power feed contact, and a power feed contact movement device. The lower guide assembly includes a lower wire guide and a lower power feed contact. The wire electrode is guided by the upper wire guide and the lower wire guide and performs discharge machining on the workpiece. The upper power feed contact and the lower power feed contact are configured to contact the wire electrode to supply power to the wire electrode by moving in a horizontal direction from initial positions not contacting the wire electrode. The power feed contact movement device is configured to move the upper power feed contact in the horizontal direction from the initial position by a predetermined offset amount. The offset amount is set based on a machining condition. The machining condition comprises at least one of a condition of the wire electrode, a condition of the workpiece, and a surface roughness required for a cut surface of the workpiece.

According to another embodiment of the invention, a wire electric discharge machining method for machining a workpiece into a required shape by supplying a series of power pulses from a power supply device to a work gap formed between a moving wire electrode and the workpiece is provided. The wire electric discharge machining method includes: a step of vertically moving the wire electrode facing the workpiece; a step of providing an upper power feed contact connected to the power supply device at a first initial position not contacting the wire electrode above the workpiece; a step of providing a lower power feed contact connected to the power supply device at a second initial position not contacting the wire electrode below the workpiece; a step of, in a first cut, moving horizontally the upper power feed contact from the first initial position by a first offset amount to contact the wire electrode, and moving horizontally the lower power feed contact from the second initial position to contact the wire electrode; and a step of, in a second cut, changing the first offset amount to a smaller value.

DESCRIPTION OF THE EMBODIMENTS

Figure 1:
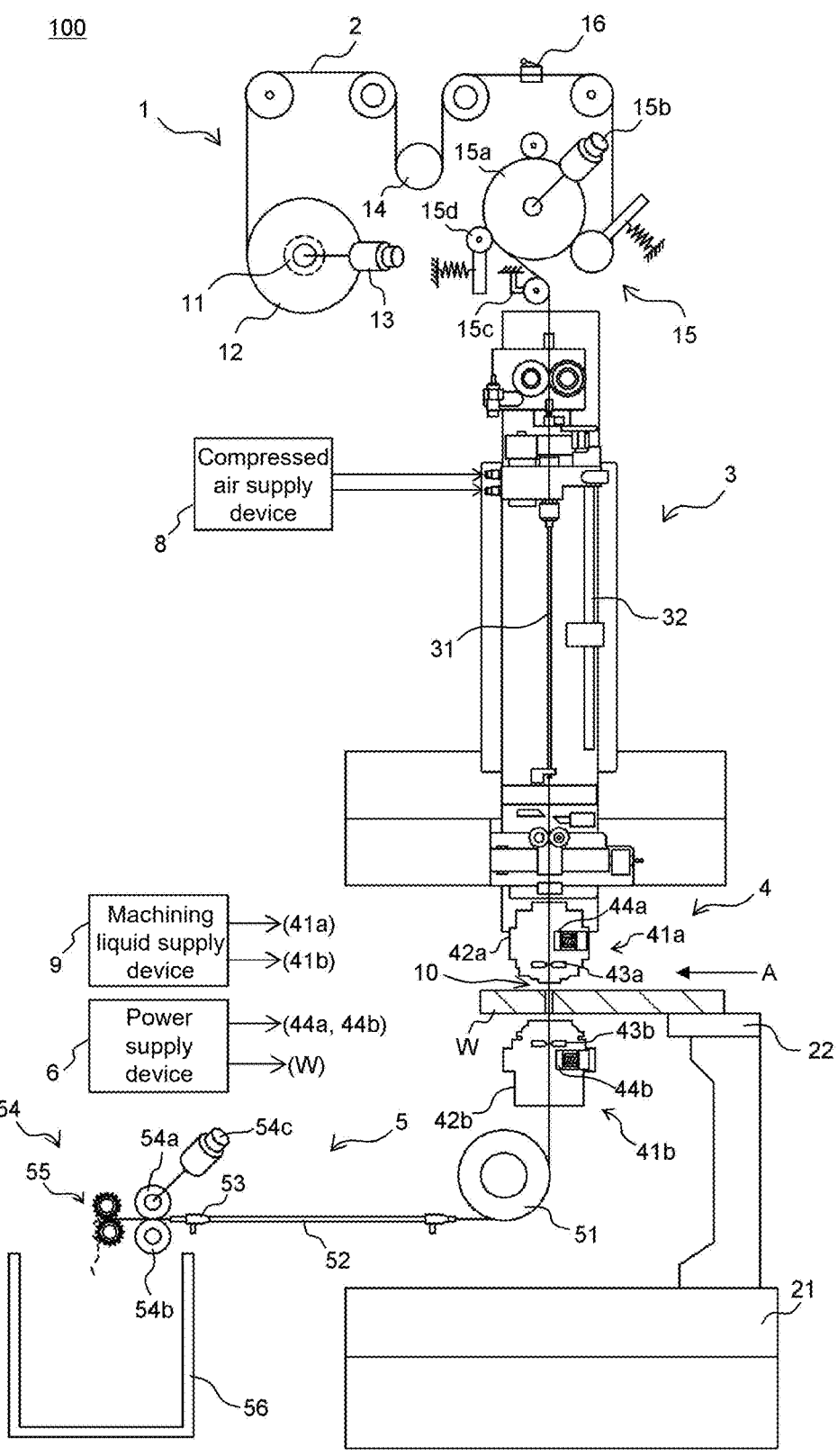
FIG. 1 is a schematic view illustrating a wire electric discharge machining apparatus 100 according to an embodiment of the invention.

In the following, the embodiments of the invention will be described with reference to the drawings. The features shown in the following embodiments may be combined with each other. An invention is established independently for each feature.
1. Wire Electric Discharge Machining Apparatus
1.1 Overall Configuration As shown in FIG. 1, a wire electric discharge machining apparatus 100 of the embodiment includes a wire electrode 2. The wire electrode 2 stretches in a state of being applied with a tension between an upper wire guide 43*a* and a lower wire guide 43*b* provided above and below a workpiece W. The wire electric discharge machining apparatus 100 includes a bed 21 placed on an installation surface of the apparatus and a table 22 provided on the bed 21 and horizontally movable. A workpiece W on which a start hole is formed is placed on the table 22. The wire electrode 2 is inserted, in order, into a guide hole of the upper wire guide 43*a*, the start hole, and a guide hole of the lower wire guide 43*b*. The workpiece W is machined by generating a discharge in a work gap 10 formed between the wire electrode 2 and the workpiece W. While being machined, the wire electrode 2 moves through a movement path.

The wire electric discharge machining apparatus 100 includes a wire supply mechanism 1, an automatic wire threading device 3, a wire guide mechanism 4, and a wire collection mechanism 5 provided in order along the movement path. In addition, the wire electric discharge machining apparatus 100 includes a power supply device 6, a compressed air supply device 8, and a machining liquid supply device 9. In the following, along the movement path, a side relatively close to the wire supply mechanism 1 is set as an upstream side, and a side close to the wire collection mechanism 5 is set as a downstream side. Regarding the rotation direction of a rotation body forming the wire electric discharge machining apparatus 100, a rotation direction when the wire electrode 2 moves from the upstream side to the downstream side is defined as a forward rotation direction, and a rotation direction opposite to the forward rotation direction is defined as a reverse rotation direction.
1.2. Wire Supply Mechanism 1

The wire supply mechanism 1 is configured to consecutively supply the new wire electrode 2 along a predetermined path, and mainly includes a reel 11, a brake device 13, a servo pulley 14, a tension application device 15, and a wire breakage detector 16. A wire bobbin 12 in which the wire electrode 2 is stored is installed to the reel 11, and when the wire bobbin 12 rotates in the forward rotation direction, the new wire electrode 2 is consecutively drawn from the wire bobbin 12. The brake device 13 is, for example, a brake motor such as a hysteresis motor or an electromagnetic brake such as an electromagnetic clutch. The brake device 13 applies a torque in the reverse rotation direction to the reel 11, and stops the wire bobbin 12 from idling and prevents the wire electrode 2 from loosening.

The servo pulley 14 is provided between the reel 11 and the tension application device 15 on the movement path, and applies a constant load downward to the wire electrode 2 by using its own weight. The servo pulley 14 is provided to be freely movable in a vertical direction. The servo pulley 14 moves vertically as the tension of the wire electrode 2 changes slightly, and absorbs slight vibration generated in the wire electrode 2 unwound from the wire bobbin 12. On the downstream side of the servo pulley 14, the wire breakage detector 16 is provided on the movement path. The wire breakage detector 16 is provided to detect a breakage of the wire electrode 2, and is configured by using a limit switch, for example.

The tension application device 15 is configured to cooperate with the wire collection mechanism 5 to apply a predetermined tension to the wire electrode 2, and includes a delivery roller 15*a*, a delivery motor 15*b*, a tension detector 15*c*, and a pinch roller 15*d*. The delivery roller 15*a* is driven by the delivery motor 15*b* to rotate. The wire electrode 2 obtains a movement driving force by being pressed against the outer peripheral surface of the delivery port 15*a* by using the pinch roller 15*d*. The wire electrode 2 is moved along the outer peripheral surface of the delivery roller 15*a* by using multiple rollers including the pinch roller 15*d*. Accordingly, the wire electrode 2 can be moved smoothly while being prevented from loosening and breakage. The tension detector 15*c* is provided to detect the tension of the wire electrode 2, and is configured by using a strain gauge, for example.

The delivery motor 15*b* is a servo motor. Based on the detection result of the tension by using the tension detector 15, the delivery motor 15*b* is under servo control. Accordingly, even if the tension is set to a low value, the tension of the wire electrode 2 is stable. As a result, the wire electrode 2 can be reliably prevented from loosening and breakage. It is also possible to control the delivery motor 15*b* in accordance with the torque of a take-up device 54 of the wire collection mechanism 5.

By adjusting the rotation speed difference between the delivery roller 15*a* and a take-up roller 54*a* of the take-up device 54, the wire electrode 2 can be applied with a predetermined tension. At the time of threading the wire electrode 2, the delivery roller 15*a* is rotated at a constant speed in the forward rotation direction, and the tip of the wire electrode 2 is inserted through the start hole to be captured by the wire collection mechanism 5. At the time of retrying the threading of the wire electrode 2, the delivery roller 15*a* is rotated at a constant speed in the reverse rotation direction, and the wire electrode 2 is pulled up to a predetermined position.
1.3 Automatic Wire Threading Device 3

The automatic wire threading device 3 inserts the tip of the wire electrode 2 delivered from the wire supply mechanism 1, in order, into the guide hole of the upper wire guide 43*a*, the start hole, and the guide hole of the lower wire guide 43*b*. The automatic wire threading device 3 includes a guide pipe 31 and a lifting device 32. The guide pipe 31 guides the wire electrode 2 downward to the upper wire guide 43*a*, so that the wire electrode 2 does not deviate from the movement path. FIG. 1 illustrates the guide pipe 31 provided at an upper limit position. The guide pipe 31 is configured to be movable in the upper-lower direction by the lifting device 32 between the upper limit position and a lower limit position located immediately above the upper wire guide 43*a*. At the time of annealing or cutting off the wire electrode 2, the lifting device 32 moves the guide pipe 31 to the upper limit position, and at the time of inserting the tip of the wire electrode 2 into the guide hole of the upper wire guide 43*a*, the lifting device 32 moves the guide pipe 31 to the lower limit position.

A wire vibration device (not shown) is provided immediately above the entrance of the guide pipe 31. The wire vibration device directly or indirectly applies a pressure to the wire electrode 2 along the movement path by using compressed air supplied from the compressed air supply device 8. Accordingly, the wire electrode 2 is moved slightly in the upper-lower direction and easily passes through the guide holes of the wire guides and the start hole.

1.2. Wire Guide Mechanism 4

Figure 2:
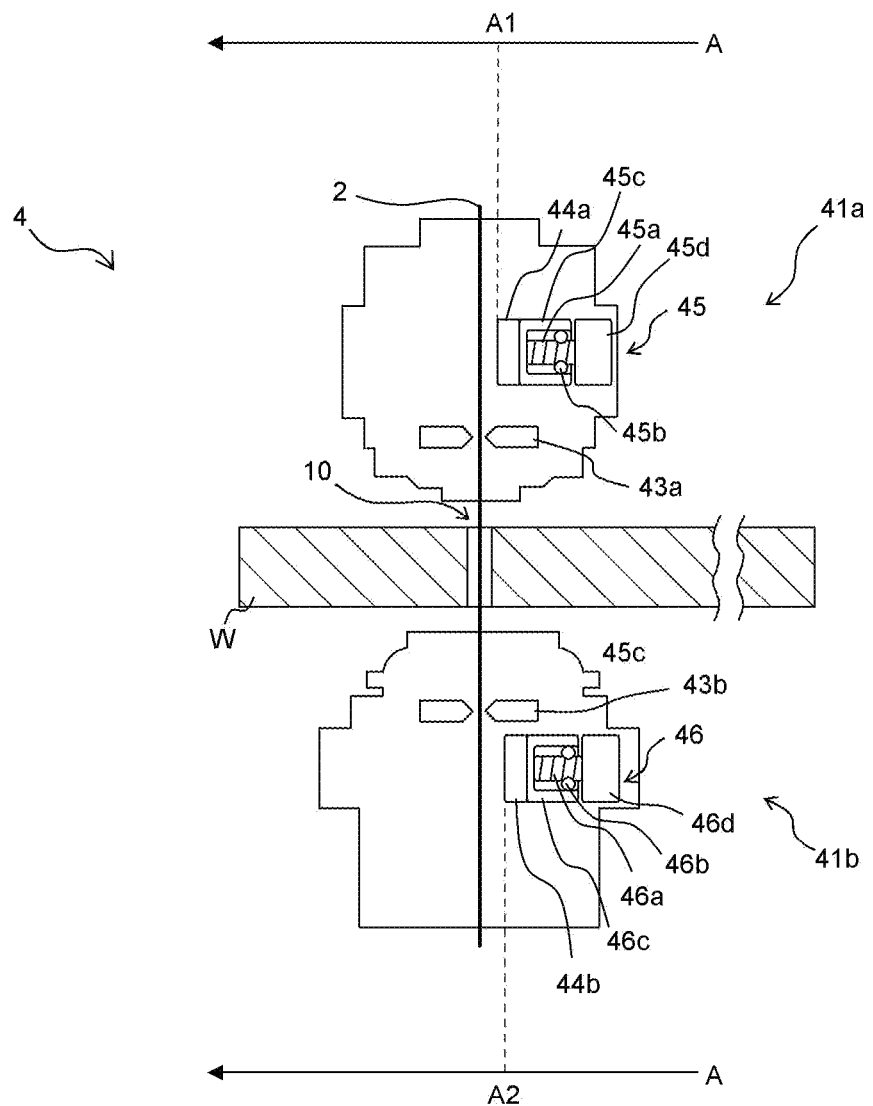
FIG. 2 is a schematic diagram illustrating a wire guide mechanism 4, and is a diagram illustrating a state in which an upper power feed contact 44a and a lower power feed contact 44b are at initial positions.

As shown in FIGS. 1 and 2, the wire guide mechanism 4 includes an upper guide assembly 41*a* and a lower guide assembly 41*b* respectively provided above and below the workpiece W.

The upper guide assembly 41*a* includes a housing 42*a*, the upper wire guide 43*a*, an upper power feed contact 44*a*, and a power feed contact movement device 45. The lower guide assembly 41*b* includes a housing 42*b*, the lower wire guide 43*b*, a lower power feed contact 44*b*, and a power feed contact movement device 46. The upper wire guide 43*a* and the lower wire guide 43*b* are respectively accommodated in the housings 42*a* and 42*b*. The upper wire guide 43*a* and the lower wire guide 43*b* are in a die shape, and respectively have guide holes. The wire electrode 2 is guided vertically by being inserted through the guide hole in a state in which a clearance of several μm with the inner surface of the guide hole is provided.

The wire electric discharge machining apparatus 100 includes a so-called taper device (not shown) that relatively moves, in the horizontal direction, one of the upper wire guide 43*a* and the lower wire guide 43*b* with respect to the other. Through the relative movement, the wire electrode 2 can be tilted with respect to the workpiece W to perform machining. A jet nozzle (not shown) provided at each of the lower end of the upper guide assembly 41*a* and the upper end of the lower guide assembly 41*b* injects a pressurized machining liquid supplied from the machining liquid supply device 9 into the work gap 10.

The upper power feed contact 44*a* and the lower power feed contact 44*b* for supplying power to the wire electrode 2 from the power supply device 6 are respectively accommodated in the housings 42*a* and 42*b*. The upper power feed contact 44*a* and the lower power feed contact 44*b* are movable in a direction of a horizontal axis A by using the power feed contact movement devices 45 and 46. In the embodiment, the power feed contact movement device 45 for moving the upper power feed contact 44*a* in the direction of the axis A is incorporated into the upper guide assembly 41*a*, and the power feed contact movement device 46 for moving the lower power feed contact 44*b* in the direction of the axis A is incorporated into the lower guide assembly 41*b*.

As shown in FIG. 2, the power feed contact movement device 45 includes a ball screw shaft 45*a* provided parallel to the direction of the axis A, a nut 45*b* screwed to the ball screw shaft 45*a*, a holding member 45*c* fixed to the nut 45*b*, and a motor 45*d*. The upper power feed contact 44*a* is provided at the tip of the support member 45*c*. When the motor 34*d* is driven, the ball screw shaft 45*a* rotates, and the nut 45*b* advances or retreats through the rotation. In addition, the upper power feed contact 44*a* moves reciprocally in the direction of the axis A as the nut 45*b* advances or retreats. The power feed contact movement device 45 is not limited to the above configuration, and may also have other configurations, as long as the upper power feed contact 44*a* is movable in a horizontal direction. For example, the power feed contact movement device 45 may also be configured by using a fluid pressure cylinder, such as a hydraulic pressure cylinder or an air pressure cylinder, an electric cylinder, a linear motor mechanism, or a rack and pinion mechanism. A lock mechanism for stopping the upper power feed contact 44*a* at a predetermined position after being moved may also be provided.

The power feed contact movement device 46 for moving the lower power feed contact 44*b* may be configured in the same way as the power feed contact movement mechanism 45 of the upper power feed contact 44*a*, and may also be configured in a different way. The power feed contact movement device 46 of the embodiment is configured in the same way as the power feed contact movement device 45, and includes a ball screw shaft 46*a*, a nut 46*b*, a support member 35*c*, and a motor 46*d*.

Figure 3:
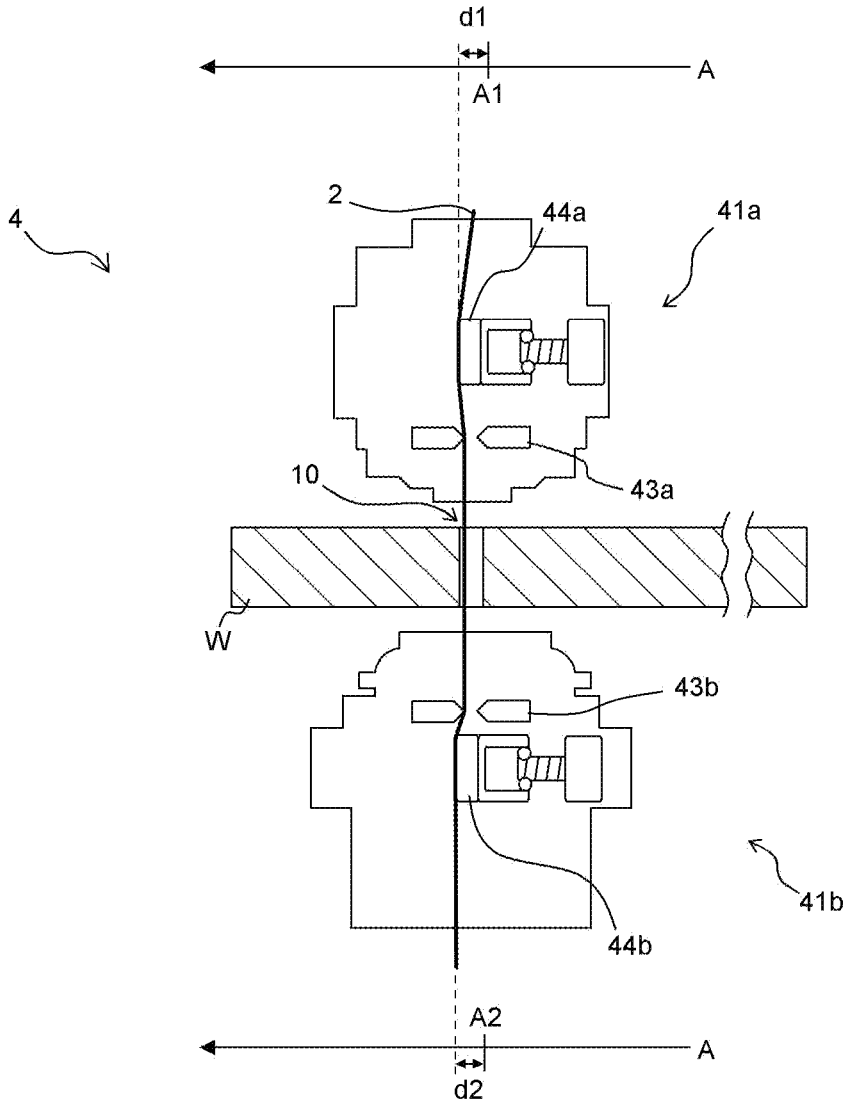
FIG. 3 is a schematic diagram illustrating the wire guide mechanism 4, and is a diagram illustrating a state in which the upper power feed contact 44a and the lower power feed contact 44b contact the wire electrode 2.

The power supply device 6 is provided to supply power to the work gap 10 to generate a discharge, and includes a DC power source, a switching element, and a discharge machining circuit (not shown) including a diode that prevents a current backflow. The upper power feed contact 44*a* and the lower power feed contact 44*b* are connected to the negative pole of the DC power source. The positive pole of the DC power source is connected to the workpiece W. FIG. 2 illustrates the upper power feed contact 44*a* and the lower power feed contact 44*b* at initial positions A1 and A2 not contacting the wire electrode 2. The upper power feed contact 44*a* and the lower power feed contact 44*b* respectively move horizontally, by a predetermined distance, from the initial positions A1 and A2 in a direction substantially vertical to the wire electrode 2. As a result, as shown in FIG. 3, the upper power feed contact 44*a* and the lower power feed contact 44*b* are brought into contact and pressed against the wire electrode 2 to an extent of bending the wire electrode 2. The distance of movement from the initial position A1/A2 of each of the power feed contacts 44*a* and 44*b* toward the direction of the horizontal axis A is referred to as an offset amount. In the embodiment, as shown in FIG. 3, the movement distance of the upper power feed contact 44*a* from the initial position A1 in the direction of the axis A is defined as an offset amount d1, and the movement distance of the lower power feed contact 44*b* from the initial position A2 in the direction of the axis A is defined as an offset amount d2.

After one or both of the upper power feed contact 44*a* and the lower power feed contact 44*b* contact the wire electrode 2, the power supply device 6 applies a series of voltage pulses to the work gap 10 via the upper power feed contact 44*a*, the lower power feed contact 44*b*, and the workpiece W. As a result, a discharge is repetitively generated in the work gap 10, and the material of the workpiece W is removed. The larger the offset amounts d1 and d2 and the larger the contact area and the contact pressure, the smaller the contact resistance. As a result, the power supplied to the wire electrode is increased.

1.5. Wire Collection Mechanism 5

The wire collection mechanism 5 collects the wire electrode 2 that has passed through the work gap 10 and has been consumed. The wire collection mechanism 5 includes a direction changing roller 51, a conveying pipe 52, an aspirator 53, the take-up device 54, a wire cutter 55, and a bucket 56. The traveling direction of the wire electrode 2 having passed the lower wire guide 43*b* is changed to the horizontal direction by the direction changing roller 51, and the wire electrode 2 is inserted into the conveying pipe 52. The wire electrode 2 in the conveying pipe 52 is attracted by the aspirator 53 and obtains a pushing power.

The take-up device 54 includes the take-up roller 54*a*, a pinch roller 54*b*, and a take-up motor 54*c*. The wire electrode 2 having passed the conveying pipe 52 is sandwiched between the take-up roller 54*a* and the pinch roller 54*b* of the take-up device 54. The take-up roller 54*a* is rotated at a predetermined rotation speed in the forward rotation direction by using the take-up motor 54*c* which is a constant-speed rotation motor, and draws the wire electrode 2 to immediate above the bucket 56. The wire electrode 2 is shredded by the wire cutter 55 and accommodated in the bucket 56.

2. Control Device 7

Figure 5:
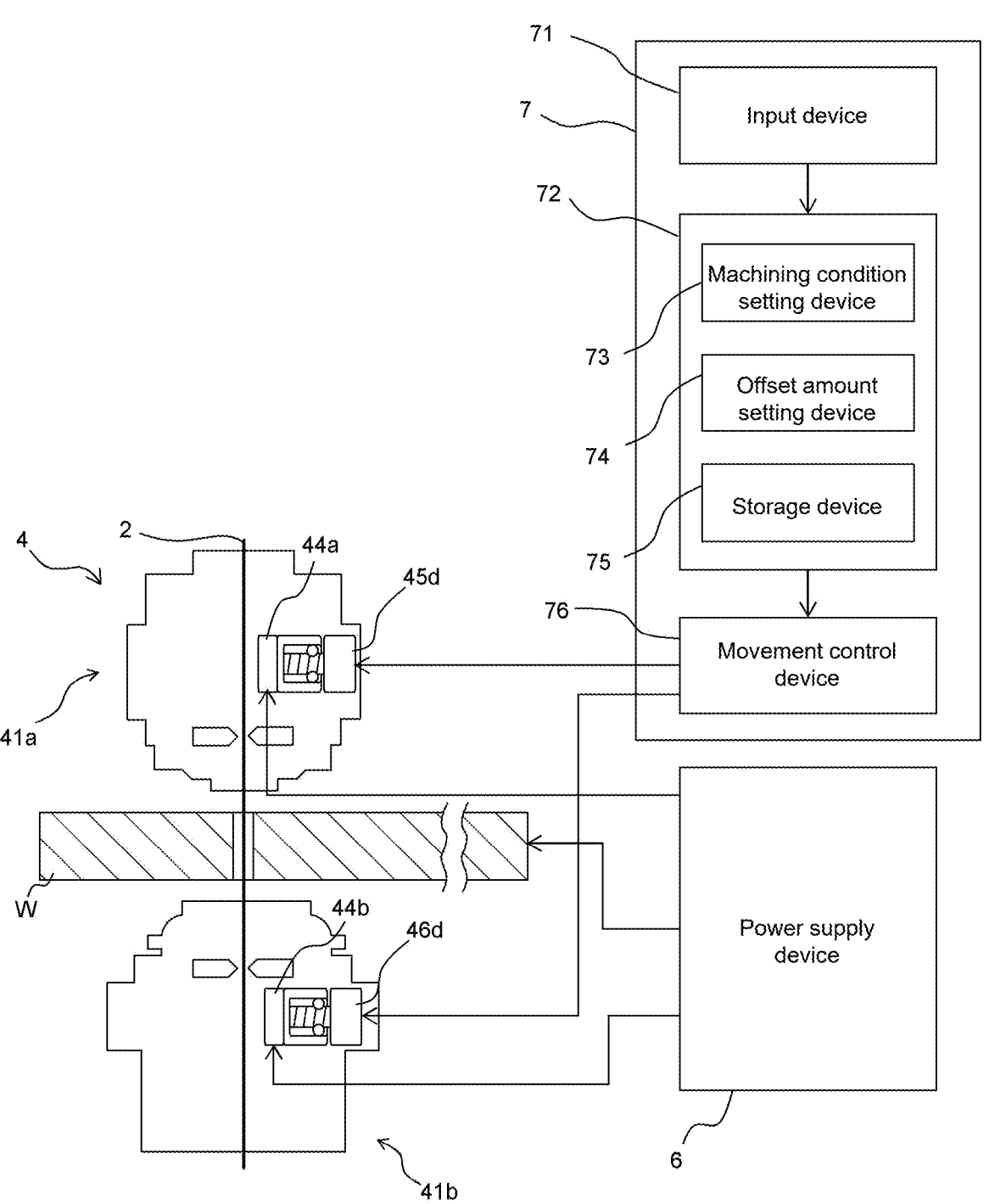
FIG. 5 is a block diagram illustrating a control apparatus 7.

The control device 7 for controlling the operation of the wire electric discharge machining apparatus 100 is described. The control device 7 controls the operation of the entire wire electric discharge machining apparatus 100 as well as the operation of each forming device. As shown in FIG. 5, the control device 7 includes an input device 71, a value control device 72, and a movement control device 76.

Each of the forming components of the control device 7 may be realized by software or hardware. When realized by software, various functions can be realized by executing computer programs with a CPU. The program may be stored in a built-in memory or a non-transitory recording medium readable by a computer. Alternatively, the above functions are realized by reading the program stored in an external memory using so-called cloud computing. When realized by hardware, the above functions can be realized by various circuits such as an application-specific integrated circuit (ASIC), a field-programmable gate array (FPGA), or a dynamically reconfigurable processor (DRP). The embodiment deals with various information and concepts including this information, and the various information is a bit group of binary numbers having 0 or 1, and the various information is represented according to the level of signal value. And in the embodiment, communications and calculations may be executed according to configurations of the above software and hardware.

The input device 71 is provided for an operator to input necessary information for various processes in the value control device 72, and can be formed by, for example, a touch panel, a keyboard, or a mouse. As input information, a machining condition may be, for example, the material or the diameter of the wire electrode 2, the material or the plate thickness of the workpiece W, and a surface roughness required on the cut surface. The input information is output to the value control device 72.

The value control device 72 uses an NC program in which data relating to the input information and the machining condition are recorded and generates an operation command to the wire electric discharge machining apparatus 100. The value control device 72 includes a machining condition setting device 73, an offset amount setting device 74, and a storage device 75.

The machining condition setting device 73 sets multiple sets of machining conditions for machining the workpiece W into a required shape. Firstly, the workpiece W is cut to a rough required shape with a large electrical energy at a high speed. Such rough machining is called first cut. At the time when the first cut is completed, surplus material that must be removed remains on the cut surface, and the cut surface does not have the required roughness. Next, the wire electrode 2 is moved along the kerf formed by the first cut and the cut surface is machined with a smaller electric energy. As a result, accuracy is improved and surface roughness is reduced. Such cut is repeated several times and several cuts with different machining conditions are collectively called second cut. The machining conditions include, for example, the condition of the wire electrode 2, the condition of the workpiece W, the required surface roughness, and the electrical machining condition. In the first cut and the second cut, the required surface roughness and the electrical machining conditions are different. The machining condition setting device 73 sets these machining conditions by reading out the machining conditions in the case where the conditions are recorded in the NC program stored in the storage device 75, or sets the machining conditions based on the input information to the input device 71. The machining conditions that are set are output in the form of a signal of the operation command or data of an operation command value to the control part of each device and mechanism forming the wire electric discharge machining apparatus 100. At least a portion of the machining conditions that are set is also output to the offset amount setting device 74.

The offset amount setting device 74 sets the offset amounts d1 and d2 based on the machining conditions transmitted from the machining condition setting device 73. The offset amount setting device 74 sets the offset amounts d1 and d2 in accordance with the machining conditions transmitted from the machining condition setting device 73 based on data indicating the relationship between the machining condition and the offset amounts d1 and d2. For example, a data table in which the machining conditions and the offset amounts d1 and d2 are recorded in a one-to-one relationship is stored in the storage device 75, and the offset amounts d1 and d2 corresponding to the machining conditions transmitted from the machining condition setting device 73 are read from the data table. Accordingly, the offset amounts d1 and d2 can be set. In another configuration, a function for obtaining the values of the offset amounts d1 and d2 from the machining conditions as variables is stored in the storage device 75, and the function is used to calculate the offset amounts d1 and d2. Accordingly, the offset amounts d1 and d2 can be set. The offset amounts d1 and d2 that are set are output as the operation command value to the movement control device 76.

The storage device 75 stores the input information transmitted from the input device 71, the NC program, the data table or function used for setting the offset amounts d1 and d2, etc.

The movement control device 74 controls the motors 45*d* and 46*d* of the power feed contact movement devices 45 and 46 in accordance with the operation command transmitted from the offset amount setting device 74, and moves the upper power feed contact 44*a* and the lower power feed contact 44*b* by the offset amounts d1 and d2 set from the initial positions A1 and A2.

In addition, the control device 7 outputs the operation command to the control part of each device and mechanism forming the wire electric discharge machining apparatus 100, and receives feedbacks of actual operation information of each device and mechanism from each control part.

3. Setting of Offset Amounts

The setting of the offset amounts d1 and d2 of the upper power feed contact 44*a* and the lower power feed contact 44*b* will be further described in detail.

In the embodiment, the offset amounts d1 and d2 are set based on various machining conditions. Specifically, the offset amount setting device 74 sets the offset amounts d1 and d2 based on the machining conditions transmitted from the machining condition setting device 73. Here, the offset amount d1 of the upper power feed contact 44*a* is set in accordance with the machining condition including at least one of the condition of the wire electrode 2, the condition of the workpiece W, and the surface roughness required for the machining surface of the workpiece W.

Regarding the condition of the wire electrode 2, as conditions having significant influences on the machining accuracy, the material and the diameter of the wire electrode 2 are exemplified. Regarding the wire electrode 2, depending on the materials, how susceptible a change of the surface state is may differ. Compared with a wire electrode formed by tungsten or a wire electrode coated with zinc, for example, the wire electrode 2 whose main component is brass is prone to generate cracks or debris. In the case where the offset amount d1 of the upper power feed contact 44*a* is set based on the material of the wire electrode 2, in the embodiment, the offset amount d1 when a material with which a change of the surface state is easily susceptible is used is set to be smaller than the offset amount d1 when a material with which a change of the surface state is hardly susceptible is used. Accordingly, in the case where a material with which a change of the surface state is easily susceptible is used, the contact pressure between the wire electrode 2 and the upper power feed contact 44*a* can be reduced, or the wire electrode 2 and the upper power feed contact 44*a* can have no contact, the generation of cracks or debris on the surface of the wire electrode 2 due to contact is suppressed, and the decrease in machining accuracy can be suppressed. It is noted that the offset amount d2 of the lower power feed contact 44*b* is set so that the wire electrode 2 and the lower power feed contact 44*b* are in sufficient contact.

The greater the diameter of the wire electrode 2, the easier the cut surface of the workpiece W becomes uneven or has strips due to cracks or debris generated on the surface. In the case where the offset amount d1 of the upper power feed contact 44*a* is set based on the diameter of the wire electrode 2, in the embodiment, the offset amount d1 when the diameter of the wire electrode 2 is equal to or greater than a predetermined threshold is set to be smaller than the offset amount d1 when the diameter is less than the threshold. Accordingly, in the case where the diameter of the wire electrode 2 is large, the contact pressure between the wire electrode 2 and the upper power feed contact 44*a* can be reduced, or the wire electrode 2 and the upper power feed contact 44*a* can have no contact, and the generation of cracks or debris on the surface of the wire electrode 2 due to contact can be suppressed. It is noted that the offset amount d2 of the lower power feed contact 44*b* is set so that the wire electrode 2 and the lower power feed contact 44*b* are in sufficient contact.

The threshold of the diameter of the wire electrode 2 used at the time of setting the offset amount d1 of the upper power feed contact 44*a* is preferably set in the range of 0.05 mm to 0.2 mm, and more preferably set in the range of 0.07 mm to 0.17 mm. By setting the threshold of the diameter in such range, the influence of the surface state of the wire electrode 2 on the machining accuracy can be sufficiently small.

The surface roughness is represented by using an index such as a maximum height Rz, an arithmetic average roughness Ra, etc., of the cut surface. The maximum height Rz is an index of surface roughness defined in JIS B 0601-2001, where a reference length is extracted from a roughness curve in the direction of an average line thereof, and the maximum height Rz represents a sum of the height of the highest peak and the trough depth of the deepest trough in the extracted portion in the unit of μm. The arithmetic average roughness Ra is an index of surface roughness defined in JIS B 0601-2001, where a reference length is extracted from a roughness curve in the direction of an average line thereof, absolute values of deviations from the average line of the extracted portion to a measurement curve are summed up, and the arithmetic average roughness Ra represents an averaged value in the unit of μm. JIS stands for Japanese Industrial Standards.

The smaller the surface roughness required for the cut surface of the workpiece W, the more conspicuous the unevenness or strips that are generated on the cut surface of the workpiece W may easily become. In the case where the offset amount d1 of the upper power feed contact 44*a* is set based on the required surface roughness, in the embodiment, the offset amount d1 when the required surface roughness is equal to or less than a predetermined threshold is set to be smaller than the offset amount d1 when the required surface roughness is set to be greater than the threshold. Accordingly, in the case where the required surface roughness is small, the contact pressure between the wire electrode 2 and the upper power feed contact 44*a* can be reduced, or the wire electrode 2 and the upper power feed contact 44*a* can have no contact, and the generation of cracks or debris on the surface of the wire electrode 2 due to contact can be suppressed. It is noted that the offset amount d2 of the lower power feed contact 44*b* is set so that the wire electrode 2 and the lower power feed contact 44*b* are in sufficient contact.

The threshold of the surface roughness used at the time of setting the offset amount d1 of the upper power feed contact 44*a* is preferably 1 to 3 μm in the case where the maximum height Rz is used as the index of surface roughness and 0.1 to 0.5 μm in the case where the arithmetic average roughness Ra is used as the index of surface roughness, and more preferably 1 to 1.5 μm in the case of the maximum height Rz and 0.1 to 0.3 μm in the case of the arithmetic average roughness Ra. By setting the threshold of surface roughness in such range, the influence of the surface state of the wire electrode 2 on the processing accuracy can be sufficiently small.

Regarding the condition of the workpiece W, as conditions having significant influences on the machining accuracy, the material and the thickness of the workpiece W are exemplified. The susceptibility of generating unevenness or strips of the cut surface in accordance with the surface state of the wire electrode 2 differs depending on the material of the workpiece W. In the case where the offset amount d1 of the upper power feed contact 44*a* is set based on the material of the workpiece W, in the embodiment, the offset amount d1 when a material with which the unevenness or strips are easily susceptible is used is set to be smaller than the offset amount d1 when a material with which the unevenness or strips are hardly susceptible is used. Accordingly, in the case where a material with which the unevenness or strips are easily susceptible on the cut surface, the contact pressure between the wire electrode 2 and the upper power feed contact 44*a* can be reduced, or the wire electrode 2 and the upper power feed contact 44*a* can have no contact, and the generation of cracks or debris on the surface of the wire electrode 2 due to contact can be suppressed. It is noted that the offset amount d2 of the lower power feed contact 44*b* is set so that the wire electrode 2 and the lower power feed contact 44*b* are in sufficient contact.

The greater the thickness of the workpiece W, the greater the influence of the surface state of the wire electrode 2 on the cut surface. In the case where the offset amount d1 of the upper power feed contact 44*a* is set based on the thickness of the workpiece W, in the embodiment, the offset amount d1 when the thickness of the workpiece W is equal to or greater than a predetermined threshold is set to be smaller than the offset amount d1 when the thickness is less than the predetermined threshold. Accordingly, in the case where the thickness of the workpiece W is large, the contact pressure between the wire electrode 2 and the upper power feed contact 44*a* can be reduced, or the wire electrode 2 and the upper power feed contact 44*a* can have no contact, and the generation of cracks or debris on the surface of the wire electrode 2 due to contact can be suppressed. It is noted that the offset amount d2 of the lower power feed contact 44*b* is set so that the wire electrode 2 and the lower power feed contact 44*b* are in sufficient contact.

As described above, in the case where the offset amount d1 of the upper power feed contact 44*a* is set to be small under the predetermined machining condition, the offset amount d1 can be set so that the upper power feed contact 44*a* contacts the wire electrode 2, that is, so that the contact pressure is weaker than the case where the machining condition is not satisfied while the upper power feed contact 44*a* contacts the wire electrode 2. For example, the offset amount d1 in the case where the diameter of the wire electrode 2 is equal to or greater than the threshold can be set to be smaller than the case where the diameter is less than the threshold, so that the upper power feed contact 44*a* contacts the wire electrode 2. The offset amount d1 in the case where the surface roughness required for the cut surface can be set to be smaller than the case where the required surface roughness is greater than the threshold, so that the upper power feed contact 44*a* contacts the wire electrode 2. Accordingly, by reducing the contact pressure with the upper power feed contact 44*a*, power can be supplied to the upper power feed contact 44*a*, while the generation of cracks or debris on the surface of the wire electrode 2 is suppressed. Therefore, the decrease in machining speed which comes along with the decrease in supplied power can be suppressed to minimum.

Figure 4:
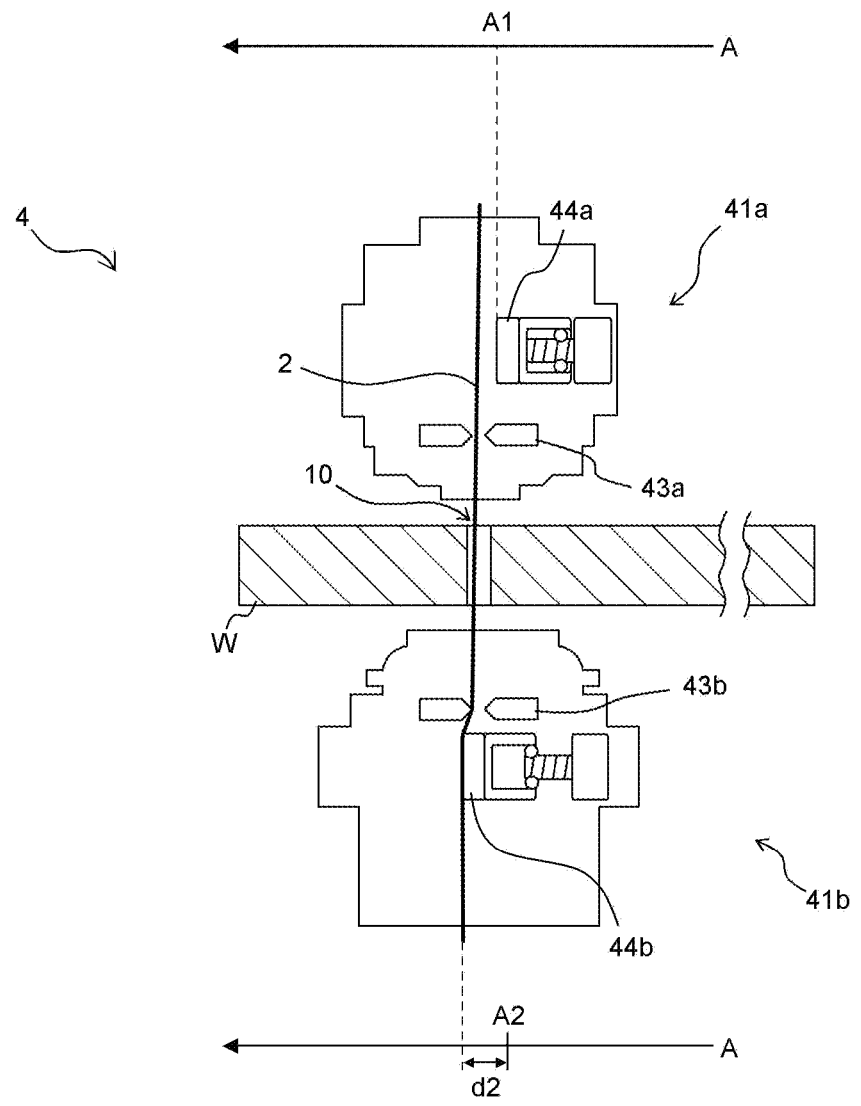
FIG. 4 is a schematic diagram illustrating the wire guide mechanism 4, and is a diagram illustrating a state in which the upper power feed contact 44a is not in contact with the wire electrode 2, and the lower power feed contact 44*b* is in contact with the wire electrode 2.

In the case where the offset amount d1 of the upper power feed contact 44*a* is set to be small under the predetermined machining condition, the upper power feed contact 44*a* can be set to not contact the wire electrode 2. In FIG. 4, the offset amount d1 is set as d1=0, and the upper power feed contact 44*a* is not moved from the initial position A1, and power is only supplied from the lower power feed contact 44*b*. For example, the offset amount d1 in the case where the diameter of the wire electrode 2 is equal to or greater than the wire electrode 2 can be set so that the upper power feed contact 44*a* and the wire electrode 2 do not contact each other. The offset amount d1 in the case where the surface roughness required for the cut surface is equal to or less than the threshold can be set so that the upper power feed contact 44*a* and the wire electrode 2 do not contact each other. In this case, the effect of suppressing cracks or debris from being generated on the surface of the wire electrode 2 due to the contact with the upper power feed contact 44*a* is the maximum.

It is noted that the configuration for setting the offset amount d1 of the upper power feed contact 44*a* is not limited to the above, and various modifications are possible. For example, the offset amount d1 is adjusted for each machining condition in the above embodiment. However, when multiple machining conditions are considered, in the case where the machining condition is a specific combination (e.g., the material of the wire electrode 2 is brass, the diameter of the wire electrode 2 is equal to or greater than the predetermined threshold, and the required surface roughness is equal to or less than the predetermined threshold), the offset amount d1 of the upper power feed contact 44*a* may also be set even smaller. In this case, the data of the optimal offset amount d1 for the combination of multiple machining conditions are stored in the form of a data table, for example, in the storage device 75 of the control device 7, and the offset amount d1 can be set by reading the data out using the offset amount setting device 74.

The adjustment to the offset amount d1 for each machining condition as described above may also be performed only in the second cut but not in the first cut. In the first cut, the accuracy required for the cut surface is lower than a finishing process. In the second cut, the machining requires a higher accuracy. Therefore, in the first cut, the upper power feed contact 44*a* and the lower power feed contact 44*b* are brought into sufficient contact with the wire electrode 2, and in the second cut, the contact pressure between the wire electrode 2 and the upper power feed contact 44*a* is reduced, or the wire electrode 2 and the upper power feed contact 44*a* do not contact each other. Accordingly, the decrease in machining speed can be suppressed to the minimum, while the decrease in machining accuracy can be suppressed.

4. Wire Electric Discharge Machining Method of Workpiece W

Figure 6:
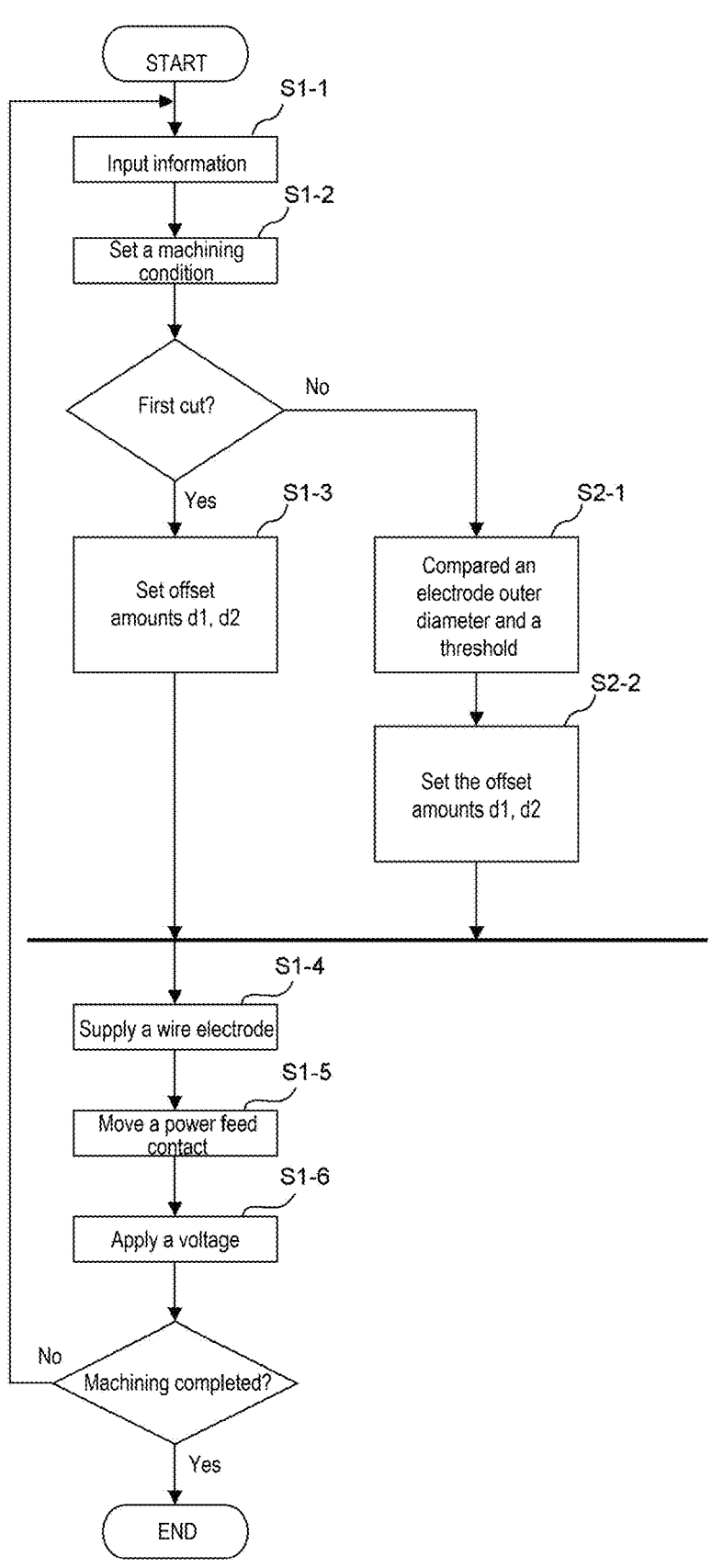
FIG. 6 is a flowchart illustrating a wire electric discharge machining method according to an embodiment of the invention.

A wire electric discharge machining method using the wire electric discharge machining apparatus 100 according to the embodiment will be described with reference to FIG. 6.

Firstly, in Step S1-1, the operator inputs necessary information for various processes in the value control device 72, and the input device 71 of the control device 7 acquires the input information. In Step S1-2, the input information is output to the value control device 72, and various machining conditions are set by the machining condition setting device 73. The machining conditions that are set are output, as an operation command, to the control part of each device and mechanism forming the wire electric discharge machining apparatus 100. At least a portion of the machining conditions is output to the offset amount setting device 74.

In Step S1-3, the offset amount setting device 74 sets the offset amounts d1 and d2 of the upper power feed contact 44*a* and the lower power feed contact 44*b* based on the machining condition transmitted from the machining condition setting device 73. In the first cut, in order to ensure a sufficient machining speed, the offset amounts d1 and d2 are set so that the upper power feed contact 44*a* and the lower power feed contact 44*b* are brought into sufficient contact with the wire electrode 2. Meanwhile, in the second cut, the offset amount d1 of the upper power feed contact 44*a* is set in accordance with the machining condition including at least one of the condition of the wire electrode 2, the condition of the workpiece W, and the surface roughness required for the machining surface of the workpiece W. In FIG. 6, as an example, the case where the offset amount d1 is adjusted in accordance with the diameter of the wire electrode 2 is shown. In Step 2-1, the diameter of the wire electrode 2 is compared with the predetermined threshold. In the case where the diameter of the wire electrode 2 is equal to or greater than the threshold, in Step 2-2, the offset amount d1 is set so that the contact pressure between the wire electrode 2 and the upper power feed contact 44*a* is reduced, or the wire electrode 2 and the upper power feed contact 44*a* do not contact each other. The offset amount d2 is set so that the wire electrode 2 and the lower power feed contact 44*b* are in sufficient contact. The offset amounts d1 and d2 that are set are output as the operation command value to the movement control device 76.

The automatic wire threading device 3 automatically inserts the wire electrode 2, in order, through the guide hole of the upper wire guide 43*a*, the start hole, and the guide hole of the lower wire guide 43*b*. By doing so, the wire electrode 2 is stretched vertically between the upper wire guide 43*a* and the lower wire guide 43*b*. In Step S1-4, the wire electrode 2 facing the workpiece is supplied downward by the take-up roller 54*a*.

In Step S1-5, the movement control device 76 respectively moves, by using the power feed contact movement devices 45 and 46, the upper power feed contact 44*a* and the lower power feed contact 44*b* by the offset amounts d1 and d2 that are set from the initial positions A1 and A2 in accordance with the operation command. In Step S1-6, the power supply device 6 operates in accordance with the operation command, and repetitively applies voltage pulses to the work gap 10 through the upper power feed contact 44*a* and the lower power feed contact 44*b*. Accordingly, a discharge is generated in the work gap 10, and the machining for a required shape is performed.

Examples

Although examples are described in the following for detailed contents, the invention shall not be construed as being limited to the examples in the following.

A discharge machining process was performed with respect to the workpiece W by using the wire electric discharge machining apparatus 100, and the state of the cut surface was observed. In all the examples and the comparative example, a metal plate made of steel and having a thickness of 40 mm was used as the workpiece W. The wire electrode 2 made of brass and having a diameter of 0.2 mm was used.

As shown in Table 1, in Examples 1 to 3 and Comparative Example 1, the upper power feed contact 44*a* was moved in the direction of the axis A from the initial position A1 by the offset amount d1 of 0.8 mm, and the lower power feed contact 44*b* was moved in the direction of the axis A from the initial position A2 by the offset amount d2 of 0.8 mm. The first cut was performed in the state in which the two power feed contacts were strongly pressed against the wire electrode 2. Following the first cut, a machining process as the second cut was performed five times.

in the direction of the axis A from the initial position A2 by the offset amount d2 of 0.8 mm.

Figures 7A, 7B, 7C, 7D:
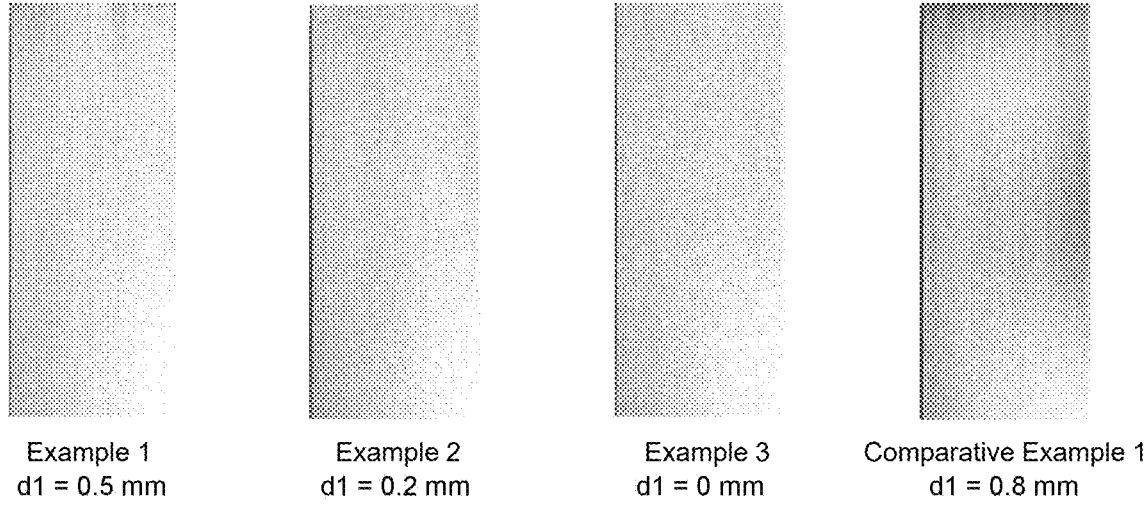
FIGS. 7A to 7D are images of cut surfaces of Embodiments 1 to 3 and Comparative Example 1.

FIGS. 7A to 7D are respectively images of cut surfaces of Examples 1 to 3 and Comparative Example 1. The cut surfaces were observed, and the result of evaluating the machining accuracy is as shown in Table 1. In Comparative Example 1 in which the offset amount d1 was maintained in the second cut, as shown in FIG. 7D, multiple undesired strips extending in the upper-lower direction were generated. In Example 1 as well, as shown in FIG. 7A, the same strips were generated, except that the strips of Example 1 were thinner than the strips in Comparative Example 1. In Examples 2 and 3, the strips were significantly fewer than Comparative Example 1.

The preferred embodiments and examples of the present invention are described above, and the present invention is not limited to that. That is, various design changes can be made as long as they are described in the claims.

What is claimed is:

1. A wire electric discharge machining apparatus, comprising a wire electrode, an upper guide assembly, and a lower guide assembly, wherein the upper guide assembly and the lower guide assembly are respectively provided above and below a workpiece, and the upper guide assembly comprises an upper wire guide, an upper power feed contact, and a power feed contact movement device, the lower guide assembly comprises a lower wire guide and a lower power feed contact, the wire electrode is guided by the upper wire guide and the lower wire guide and performs discharge machining on the workpiece, the upper power feed contact and the lower power feed contact are configured to contact the wire electrode to supply power to the wire electrode by moving in a horizontal direction from initial positions not contacting the wire electrode,

TABLE 1

| | Offset Amount | | | | Machining |
| | First cut | | Second cut | | accuracy |
| | d1 [mm] | d2 [mm] | d1 [mm] | d2 [mm] | evaluation result |
|---|---|---|---|---|---|
| Embodiment 1 | 0.8 | 0.8 | 0.5 | 0.8 | NOT BAD |
| Embodiment 2 | 0.8 | 0.8 | 0.2 | 0.8 | GOOD |
| Embodiment 3 | 0.8 | 0.8 | 0 | 0.8 | GOOD |
| Comparative Example 1 | 0.8 | 0.8 | 0.8 | 0.8 | BAD |

In the second cut, in Examples 1 and 2, the upper power feed contact 44*a* was moved in the direction of the axis A from the initial position A1 by the offset amounts d1 of 0.5 and 0.2 mm, respectively, and contacted the wire electrode 2 at a contact pressure weaker than that of the first cut. In Example 3, the upper power feed contact 44*a* was not moved from the initial position A1, and did not contact the wire electrode 2. In Examples 1 to 3, the lower power feed contact 44*b* was moved in the direction of the axis A from the initial position A2 by the offset amount d2 of 0.8 mm.

In Comparative Example 1, like the first cut, the upper power feed contact 44*a* was moved in the direction of the axis A from the initial position A1 by the offset amount d1 of 0.8 mm, and the lower power feed contact 44*b* was moved the power feed contact movement device is configured to move the upper power feed contact in the horizontal direction from the initial position by a predetermined offset amount, the offset amount is set based on a machining condition, and the machining condition comprises at least one of a condition of the wire electrode, a condition of the workpiece, and a surface roughness required for a cut surface of the workpiece.

2. The wire electric discharge machining apparatus as claimed in claim 1, comprising:

a machining condition setting device; and an offset amount setting device, wherein the machining condition setting device sets the machining condition, the offset amount setting device, based on data indicating a relationship between the machining condition and the offset amount, sets the offset amount in accordance with the machining condition set by the machining condition setting device, and the power feed contact movement device is configured to move the upper power feed contact by the offset amount set by the offset amount setting device.

3. The wire electric discharge machining apparatus as claimed in claim 2, wherein the condition of the wire electrode comprises at least one of a material and a diameter of the wire electrode.

4. The wire electric discharge machining apparatus as claimed in claim 2, wherein the condition of the workpiece comprises at least one of a material and a thickness of the workpiece.

5. The wire electric discharge machining apparatus as claimed in claim 2, wherein the offset amount is set, so that the offset amount in a case where the surface roughness is equal to or less than a predetermined threshold is smaller than the offset amount in a case where the surface roughness is greater than the threshold.

6. The wire electric discharge machining apparatus as claimed in claim 1, wherein the condition of the wire electrode comprises at least one of a material and a diameter of the wire electrode.

7. The wire electric discharge machining apparatus as claimed in claim 6, comprising:

wherein the condition of the wire electrode comprises the diameter of the wire electrode, and the offset amount is set so that the offset amount in a case where the diameter is equal to or greater than a predetermined threshold is smaller than the offset amount in a case where the diameter is less than the threshold.

8. The wire electric discharge machining apparatus as claimed in claim 7, comprising:

wherein the offset amount in the case where the diameter is equal to or greater than the threshold is set so that the upper power feed contact contacts the wire electrode.

9. The wire electric discharge machining apparatus as claimed in claim 7, comprising:

wherein the offset amount in the case where the diameter is equal to or greater than the threshold is set so that the upper power feed contact does not contact the wire electrode.

10. The wire electric discharge machining apparatus as claimed in claim 6, wherein the condition of the workpiece comprises at least one of a material and a thickness of the workpiece.

11. The wire electric discharge machining apparatus as claimed in claim 6, wherein the offset amount is set, so that the offset amount in a case where the surface roughness is equal to or less than a predetermined threshold is smaller than the offset amount in a case where the surface roughness is greater than the threshold.

12. The wire electric discharge machining apparatus as claimed in claim 1, wherein the condition of the workpiece comprises at least one of a material and a thickness of the workpiece.

13. The wire electric discharge machining apparatus as claimed in claim 1, wherein the offset amount is set, so that the offset amount in a case where the surface roughness is equal to or less than a predetermined threshold is smaller than the offset amount in a case where the surface roughness is greater than the threshold.

14. The wire electric discharge machining apparatus as claimed in claim 13, comprising:

wherein the offset amount in the case where the surface roughness is equal to or less than the threshold is set so that the upper power feed contact contacts the wire electrode.

15. The wire electric discharge machining apparatus as claimed in claim 13, comprising:

wherein the offset amount in the case where the surface roughness is equal to or less than the threshold is set so that the upper power feed contact does not contact the wire electrode.

* * * * *